United States Patent
Birken et al.

[11] Patent Number: 5,997,607
[45] Date of Patent: Dec. 7, 1999

[54] PROCESS OF CONDENSING METAL IN CONDENSATION CHAMBER

[76] Inventors: Stephen M. Birken, 23 Mohawk Trail; Karl Birken, 38 Grant Hills Ct., both of Clifton Park, N.Y. 12065

[21] Appl. No.: 09/048,702

[22] Filed: Mar. 26, 1998

Related U.S. Application Data

[60] Provisional application No. 60/063,422, Oct. 28, 1997.

[51] Int. Cl.⁶ .................................................. C22B 34/00
[52] U.S. Cl. .......................... 75/414; 75/10.29; 75/619; 266/152
[58] Field of Search ........................ 75/414, 619, 10.29; 266/152

[56] References Cited

U.S. PATENT DOCUMENTS

| | | | |
|---|---|---|---|
| 2,882,143 | 4/1959 | Schmidt et al. | 75/619 |
| 5,460,642 | 10/1995 | Leland | 75/619 |
| 5,772,724 | 6/1998 | Inoue et al. | 75/10.28 |

*Primary Examiner*—Melvyn Andrews
*Attorney, Agent, or Firm*—Rader, Fishman & Grauer PLLC

[57] ABSTRACT

A condensation chamber and method for condensing a metal connate from a metal rich gaseous mixture. The condensation chamber includes top and sidewall surfaces that together define a central bore. A gas supply is received in the bore, and as the gas begins to cool, a metal connate condensate forms on the surfaces of the condensation chamber. A moveable surface is received in the bore for removing the connate from the surfaces adjacent the bore. To facilitate removal of the connate, the surfaces adjacent the bore are heated to ensure that the connate remains substantially in the liquid state while in the condensation chamber. The moveable surface helps direct the connate into a cooling chamber supported by the condensation chamber. In the cooling chamber, the connate is cooled to a plastic state. The cooled connate may be formed into pellets and stored for later use.

5 Claims, 1 Drawing Sheet

PROCESS OF CONDENSING METAL IN CONDENSATION CHAMBER

A. 35 U.S.C. §119(e)

This application claims the benefit of U.S. Provisional Application No. 60/063,422 filing date Oct. 28, 1997.

FIELD OF THE INVENTION

The present invention relates generally to a condensation chamber for condensing metals from a metal rich gas. More particularly, the invention relates to a condensation chamber having heated sidewalls, a moveable surface for removing condensate from the walls of the condensation chamber and a cooling chamber supported by the condensation chamber.

BACKGROUND OF THE INVENTION

Various types of apparatuses and methods may be used to condense a metal from a gaseous mixture including a vaporized metal constituent. Often, the gas is mixed with an inert gas or liquid carrier. If the inert carrier is a vapor, the mixture may be cooled adiabatically by expanding the mixture through a convergent-divergent nozzle to produce a condensate containing metal particulates. The metal condensate is generally self-discharged from the nozzle. If the carrier is a liquid, the gas may be condensed and dissolved in the liquid carrier and further processed to recover the desired metal constituent.

A system is needed that would ensure that substantially all of the condensate formed during the condensation process is removed or collected from the condensation chamber, thus reducing the amount of material wasted during the process. Additionally, a system is needed that would eliminate the need to mix the gas to be processed with an inert carrier of any nature.

SUMMARY OF THE INVENTION

The present invention is directed to an apparatus and method for producing a condensate from a gas source. The apparatus includes at least one heated condensation chamber, a moveable surface and a cooling chamber.

The condensation chamber may include a central bore surrounded by a housing having left, right sidewalls and a top surface. The sidewalls of the condensation chamber may be heated to ensure that the surfaces contiguous with the bore of the condensation chamber maintain a desired temperature gradient, such that the temperature of surfaces adjacent the bore vary progressively from a maximum to a minimum temperature.

The condensation chamber also includes an inlet opening defined by the right sidewall surface. The inlet directs the gas into the bore of the condensation chamber. A flow valve may be used to direct the gas from a gas supply into the inlet. The gas may include a vapor comprising titanium or other metals having similar properties.

The gas begins to cool once it enters the condensation chamber, causing a condensate to form along the surfaces adjacent the bore of the condensation chamber. The moveable surface is received within the condensation chamber for dislodging or removing the condensate from the surfaces adjacent the bore.

The cooling chamber is supported by the lower end of the condensation chamber. The moveable surface facilitates the movement of the condensate from the condensation chamber and into the cooling chamber. The cooling chamber may support at least one cooling coil, and as the condensate passes through the cooling chamber, the condensate is cooled to a plasticity-like consistency.

Additionally, the apparatus may include a collection chamber for receiving the condensate from the cooling chamber. Alternatively, the apparatus may include an alignment guide such as a feed wheel that receives the condensate from the cooling chamber. The alignment guide directs the condensate to a cutting wheel where the connate is cut into ingots or segments. Lastly, the condensate may be stored in a collection chamber or wrapped on a storage spindle.

A method for condensing a condensate from the gas source comprises the steps of providing at least one condensation chamber for receiving the gas source; heating the condensation chamber; condensing a condensate from the gas received in the condensation chamber; removing the condensate from the condensation chamber; cooling the condensate; and preparing the condensate for packaging. Typically the condensate is cooled until it reaches a plasticity-like consistency.

BRIEF DESCRIPTION OF THE DRAWINGS

The features and inventive aspects of the present invention will become more apparent upon reading the following detailed description, claims and drawings, of which the following is a brief description:

DESCRIPTION OF A PREFERRED EMBODIMENT

Figure 1:
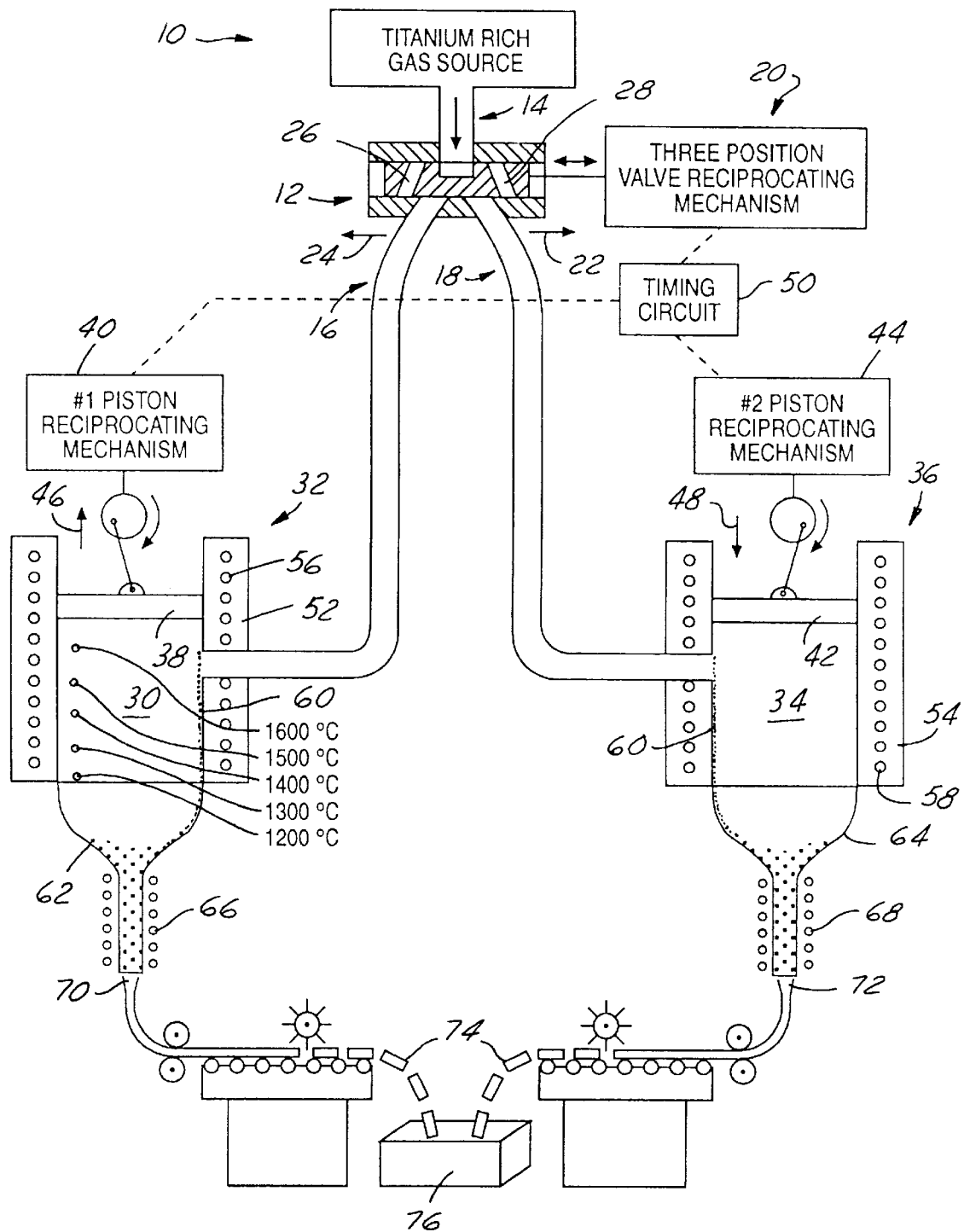
FIG. 1 is a side cross-sectional view showing a condensation chamber formed in accordance with the teachings of the present invention installed in an apparatus for processing a gaseous mixture including a vaporized metal element.

The invention is directed to an apparatus for condensing metal from a gaseous mixture containing a vaporized metal element. The constituent components of the apparatus include at least one condensation chamber, a moveable surface and a cooling chamber. The components may be structurally supported by a base or enclosed within a housing.

FIG. 1 shows a preferred embodiment of an apparatus 10 formed in accordance with the teachings of this invention. As shown in FIG. 1, metal rich gas source 10 is coupled to three position valve 12 by way of conduit 14. Metal rich gas source 10 can be any source of metal rich gas comprising a gaseous mixture including a vaporized metal element, compound, alloy or other element in intimate mutual relation with a metal element. For example, the metal rich gas source 10 may include precious metals such as gold, silver, or titanium. The metal rich gas may be prepared by vaporizing rutile by exposing the rutile to an electric arc, plasma torch, high power microwaves, and the like. One skilled in the art will appreciate that the metal rich gas source may be produced using commonly known methods and techniques. Three position valve 12 is capable of assuming one of three positions. As shown in FIG. 1, three position valve 12 is in the center or "blocked" position whereby conduit 14 is sealed and is not connected to conduit 16 or conduit 18. When reciprocating mechanism 20 maneuvers valve 12 to the rightmost position 22, conduit segment 26 of valve 12 bridges between conduit 14 and 16 and allows metal rich gas to flow from source 10 into conduit 16. Likewise, when reciprocating mechanism 20 manipulates valve 12 to the leftmost position 24, valve conduit 28 bridges the gap between conduit 14 and conduit 18 thereby allowing metal rich gas to flow from source 10 into conduit 18. Three position valve 12 operates in a style similar to that of a spool-type valve and the operation of such a valve is well known to those skilled in the art.

Conduit 16 is connected to bore 30 of condensation chamber 32 and conduit 18 is connected to bore 34 of condensation chamber 36. Piston 38 reciprocates within bore 30 by way of reciprocating mechanism 40, and likewise piston 42 reciprocates within bore 34 by way of reciprocating mechanism 44. The pistons 38, 42 close the open top of the condensation chamber 32, 36. Preferably, pistons 38 and 42 are phased 180° apart such that when piston 38 is moving upward 46 within bore 30, piston 42 is moving downward 48 within bore 34. This construction, as discussed, ensures a continuous flow of condensate from the condensation chambers 32, 36. The timing of the movement of valve 12, piston 38, and piston 42 is established by way of timing circuit 50. However, other similar methods may be used to actuate movement of valve 12. Timing circuit 50 operates to command reciprocating mechanism 20 to reciprocate valve 12 to the right 22 and to the left 24 in such a way that when piston 38 is traveling through its upstroke motion 46, titanium rich gas source 10 is coupled to cylinder 30 by way of conduit 16. Likewise, when piston 42 is moving through its upstroke motion, timing circuit 50 will command reciprocating mechanism 20 to position valve 12 to the rightmost position whereby metal rich gas source 10 is coupled to conduit 18 by way of valve 12. In view of this arrangement, it is easily seen that when pistons 38, 42 are moving upwardly within their respective bores 30, 34, they are effective for drawing metal rich gas from source 10, through valve 12, through their respective conduits 16, 18 into their respective bores 30, 34.

Bores 30, 34 are preferably shaped as circular cylinders and are defined by their respective sidewalls 52, 54. Sidewalls 52, 54 contain heating coils 56, 58 for controlling the temperature gradient of the wall. Preferably, the walls of the bores 30, 34 are the most hot proximate pistons 38, 42 and are the least hot distal from the pistons 38, 42. An example of this heating gradient is shown in the rightmost condensation chamber 32 wherein a temperature gradient range of 1600° C. to 1200° C. is depicted.

As metal rich gas is drawn into the cylinders 30, 34, from source 10, it begins to cool from its original temperature. As the metal rich gas begins to cool, it forms metal connate 60 on the walls of bores 30, 34. The temperature distribution in the walls of the condensation chamber, discussed above, helps ensure that the condensate will remain substantially in the liquid state while inside the condensation chamber. As the pistons 38, 40 move downward within their respective bores 30, 34, they dislodge the metal connate 60 from the sidewalls 52, 54 and push it down into the respective funnel 62, 64. Funnels 62, 64 are surrounded by cooling coils 66, 68 which cool the connate to a plastic state. In the plastic state 70, 72, the connate can be packaged in any number of ways. In FIG. 1, the packaging of the metal includes cutting it into pellets 74 and placing the pellets into a suitable container 76. Of course, any number of packaging methods can be used including winding the metal directly into coils or directly forming the metal into ingots.

Because of the extreme high temperatures associated with the processing of the metal rich gas, the materials used to construct the apparatus of the present invention must be capable of withstanding the temperatures to which the apparatus will be exposed. For example, the preferred material for fabricating valve 12, conduit 16, 18, pistons 38, 42, and walls 52, 54 of condensation chamber 32, 36 respectively is an alloy of molybdenum or any suitable high temperature alloy of tungsten. Preferably, funnels 62, 64 are comprised of tungsten carbide or any other material having similar properties.

The apparatus 10 can be constructed by one of ordinary skill in the art using generally known knowledge and techniques. Therefore, an explanation of how to construct the apparatus is unnecessary.

Also, it is understood that although the embodiment chosen here to illustrate the present invention utilizes two pistons, a single piston unit would also be capable of carrying out the invention as well as a unit having three or more pistons. Consequently, there are a variety of configurations which may be employed in forming the components described herein. Thus, the disclosed embodiment is given to illustrate the invention. However, it is not meant to limit the scope and spirit of the invention. Therefore, the invention should be limited only by the appended claims.

We claim:

1. A process for condensing a metal from a metal rich gas source comprising:

providing at least one condensation chamber for receiving a metal rich gas containing a desired metal product to be recovered, the condensation chamber includes a top surface and sidewall surfaces that together define a central bore;

heating the surfaces of the condensation chamber;

condensing a metal connate from the gas received in the condensation chamber;

cooling the connate; and preparing the connate for packaging.

2. The process as defined in claim 1, wherein the process further includes cutting the cooled connate into segments.

3. The process as defined in claim 1, wherein the connate is cooled to a plastic state.

4. The process as defined in claim 1, wherein the metal rich gas source includes titanium.

5. The process as defined in claim 1, wherein the surface temperature of walls adjacent the bore decreases progressively from a maximum to a minimum.

* * * * *